United States Patent [19]

Curley

[11] 4,251,937
[45] Feb. 24, 1981

[54] COLLAPSIBLE TWO SPECIE DUCK OR GOOSE DECOYS

[76] Inventor: Orvin B. Curley, 3726 Towne Park Cir., Pomona, Calif. 91767

[21] Appl. No.: 21,717

[22] Filed: Mar. 19, 1979

[51] Int. Cl.³ ............................................ A01M 31/06
[52] U.S. Cl. ...................................................... 43/3
[58] Field of Search ........................................ 43/2, 3

[56] References Cited

U.S. PATENT DOCUMENTS

| 1,062,713 | 5/1913 | Johnson | 43/3 |
| 2,313,353 | 3/1943 | Mills | 43/3 |
| 2,662,327 | 12/1953 | Petersen | 43/3 |
| 3,245,168 | 4/1966 | Pool | 43/3 |
| 3,401,476 | 9/1968 | Trumbo | 43/3 |
| 3,800,457 | 4/1974 | Barrett | 43/3 |

Primary Examiner—Nicholas P. Godici
Attorney, Agent, or Firm—Paul A. Weilein

[57] ABSTRACT

A collapsible decoy comprised of two main body halves which are joined together along the upper back portion by a hinge thus allowing one main body half to be folded over the other. The coloration of the body halves is such that when one body half is folded over the other one, a different specie of water fowl becomes visible. A pivotal mount for the decoy is provided with an adjustable friction device to control movement of the decoy under various wind conditions.

6 Claims, 7 Drawing Figures

COLLAPSIBLE TWO SPECIE DUCK OR GOOSE DECOYS

BACKGROUND OF THE INVENTION

Various types of goose and duck decoys are available to the sportsman to attract the waterfowl within shooting range. Ducks and especially geese are prone to be attracted to a decoy or decoys having the coloration simulating their own species. Experienced hunters are aware of this and will put out decoys of the particular species they wish to attract.

One of the problems the hunter or sportsman faces is that of changing the decoys when he wishes to attract a different species of water fowl. Changing a decoy spread is not only time consuming and detracts from the enjoyment of the hunt, but also requires additional decoys to be carried or transported to the hunting area.

Foldable or collapsible goose or duck decoys, as disclosed is prior U.S. Pat. Nos. 2,450,572; 2,478,585; 2,489,271 and 2,662,327 are limited to depiction of a single species of water fowl inherent in the construction of the decoy or intent of the inventor, thus requiring a plurality of decoys of different species if he is desirous of attracting different species of water fowl. It is not uncommon for a decoy spread to consist of forty to fifty decoys so the handling of a large number of decoys becomes quite burdensome.

The desirability of being able to change a decoy so as to change its coloration to simulate different species has heretofore been appreciatd, as exemplified by the disclosures in prior U.S. Pat. Nos. 547,033; 747,732; 2,706,357; 2,880,544 and 3,470,645 which all disclose the concept of utilizing removable and variable slip covers for obtaining the different display species. The slip cover concept is time consuming and requires that a large number of separated covers be carried by the hunter.

The present invention seeks to overcome the disadvantages of the above noted patents and provides a unique foldable and collapsible decoy in which two main body forming halves with attached head and neck portions are so hinged and releasably interconnectable that they can be folded in one direction to represent one species of water fowl, and in a reversed direction to represent a different species.

A further feature of the present invention resides in the provision of a unique support for each decoy which permits it to rotatably swing in the wind, the support being provided with an adjustable brake to regulate its swinging movements to relatively slow movements which enhance the effectiveness of the decoy, and prevents quick and erratic movements which might tend to startle and alarm an approaching flock of fowl.

SUMMARY OF THE INVENTION

Of the many types of goose and duck decoys available to the sportsman, they all have in common the feature of each decoy representing or simulating a single specie. Ducks and especially geese, are prone to be attracted to a decoy or decoys having the coloration simulating their own specie. If the user desires to decoy more than one specific specie of goose or duck, he will carry or transport a group of decoys that simulate one particular specie and another group or plurality of decoys to simulate a different specie.

One of the objects of this invention is to provide a novel collapsible goose or duck decoy which can be converted readily and easily from one goose or duck specie to another thus doubling its utility to the user.

Another object of the invention is to reduce the plurality of decoys the user needs to carry or transport when desiring to decoy more than one specie of waterfowl.

A further object is to reduce the cost of this general type of decoy, since the major part of the materials normally used to fabricate a single specie decoy will suffice to make a decoy that can be used to simulate two species.

Still another object of the invention is to provide a means for controlling movement of the decoy when affected by wind currents.

Other objects and advantages of the invention reside in details of construction and mode of operation more fully described and claimed by reference to the accompanying drawings forming a part hereof and wherein like reference numerals refer to the same or similar parts throughout the several views.

DETAILED DESCRIPTION OF THE INVENTION

Figure 1:
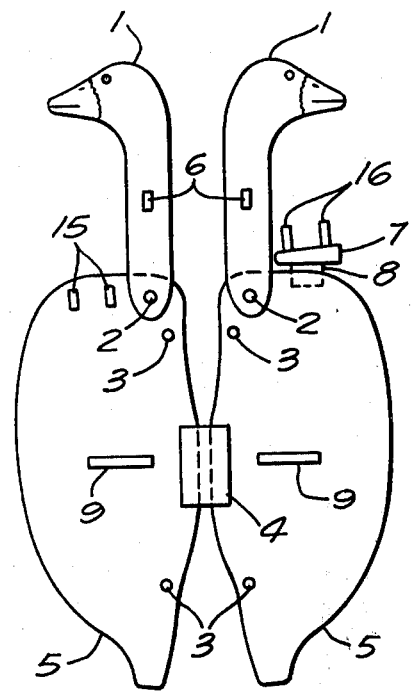
FIG. 1 is a plan view showing the surface areas of the two-hinged body forming side members and associated head and neck portions, as utilized to simulate one decoy species.
Figure 2:
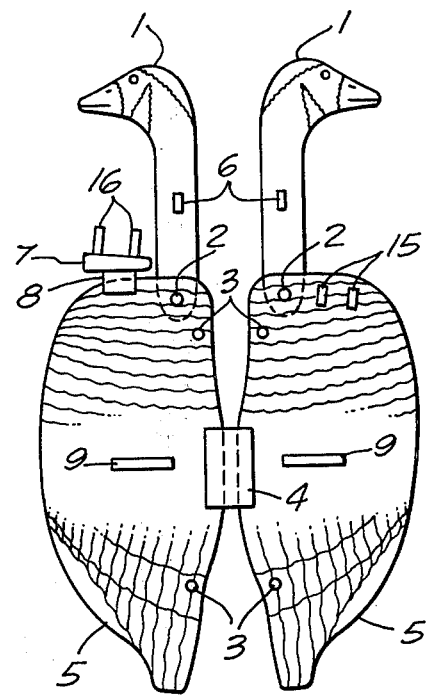
FIG. 2 is a reversed plan view of FIG. 1, showing the surface areas as utilized to simulate a different decoy species.

Referring now to the drawings in detail the numeral 5 designates the two body forming side members of the decoys made from suitable light weight, somewhat flexible, water proofed sheet material. The numeral 1 designates the head and neck forming members of the decoy made from the same material as the sides and is swingably attached to each side member by a rivet 2. The two sides are fastened together at one point along the upper back portion preferably by a hinge 4 made from canvas, nylon or other durable cloth like material. One surface of each side member including the head and neck is painted, decorated or ornamented to simulate one specie of a goose or duck. The opposite surface of each side member including the head and neck is painted, decorated or ornamented to simulate a different specie of a goose or duck. The same coloration scheme applies to a flap 7 attached to one side member only. Reference is made to FIGS. 1 and 2, where for purposes of illustration and clarity, FIG. 1 shows one surface of the main body forming side members which would be suitably painted, decorated or ornamented to simulate, for example, the plumage of a Snow Goose. FIG. 2 shows the opposite surfaces of the same body forming side members which would be painted, decorated or ornamented to simulate, for example, the plumage of a Canadian Honker Goose. In addition, FIG. 2 shows a flap 7 which would have the same coloration scheme as the main body halves. The decoy is not limited, of course, to these two particular species which are used only as examples.

Figures 3, 4:
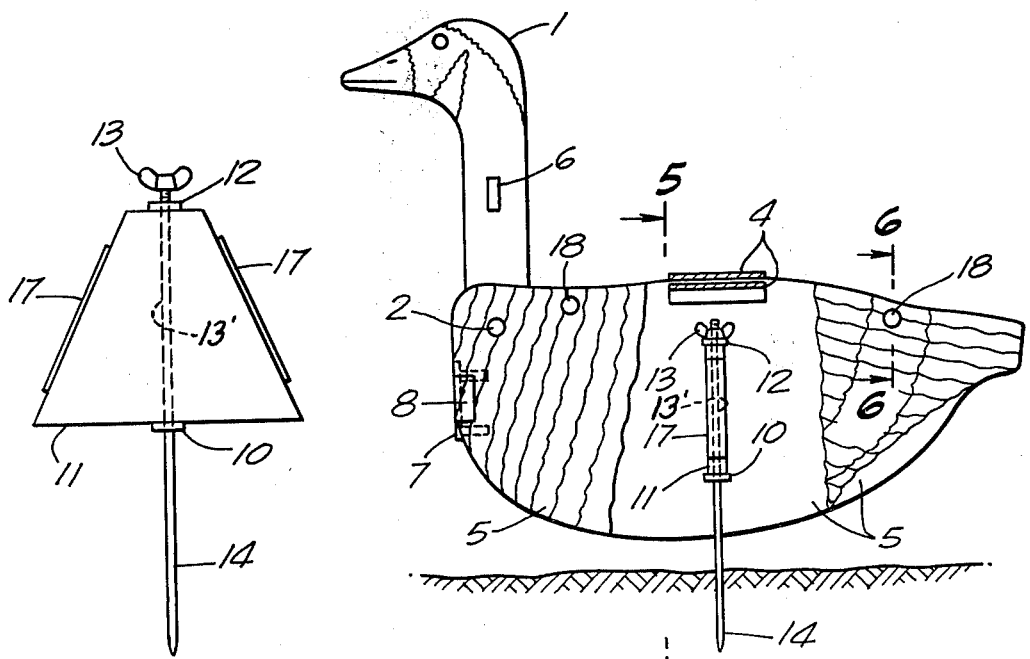
FIG. 3 is an elevational view of a spreader and support assembly for the decoy.
FIG. 4 is an enlarged side elevational view, showing the decoy in a natural upright assembled position with one of the body forming side members broken away to disclose the spreader and support assembly.
Figure 5:
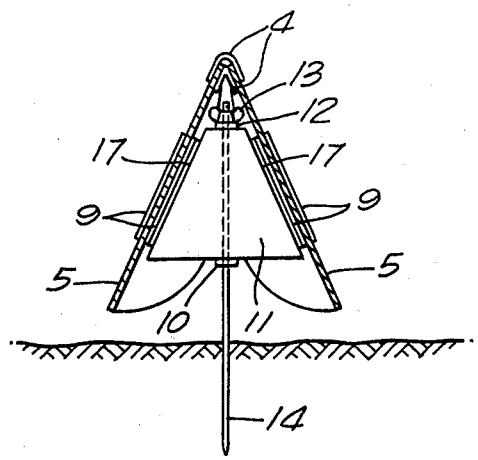
FIG. 5 is a transverse sectional view, taken substantially on line 5—5 of FIG. 4.

In FIG. 3, there is shown a mounting device for the decoy consisting of a generally triangular shaped spreader panel 11 of wood, plastic or other suitable material having a passage 13' through its vertical axis slightly larger in diameter than a metal stake 14. The metal stake 14 has an abutment flange 10 welded to it, and is threaded on one end and comes to a point on the other end. The metal stack 14 is inserted through the passage 13' and over the top or threaded end of the stake a washer 12 is placed followed by a wing-nut 13. On each side edge of the spreader panel 11, there is glued or otherwise fastened a strip 17 of press-to-lock nylon or polyester adhesive material or tape.

Rotation of the spreader panel 11, around the metal stake 14 can be adjusted to range from freely rotating to non-rotating by the pressure or friction applied to the panel 11 by tightening or loosening the wing-nut 13. Thus, when the decoy is placed on this mounting device in an operational position, movement of the decoy when acted upon by wind currents can be controlled. In general, movement of a decoy enhances it's effectiveness provided the movement appears natural. The user or sportsman then has some control of decoy movement under various wind conditions which is a distinct advantage and improvement over the commonly used mounting devices for this general type of decoy.

Figure 6:
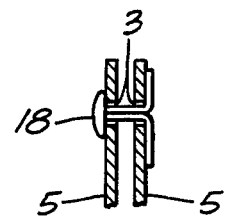
FIG. 6 is a transverse fragmentary sectional view taken substantially on line 6—6 of FIG. 4, to show details of the top edge fasteners.
Figure 7:
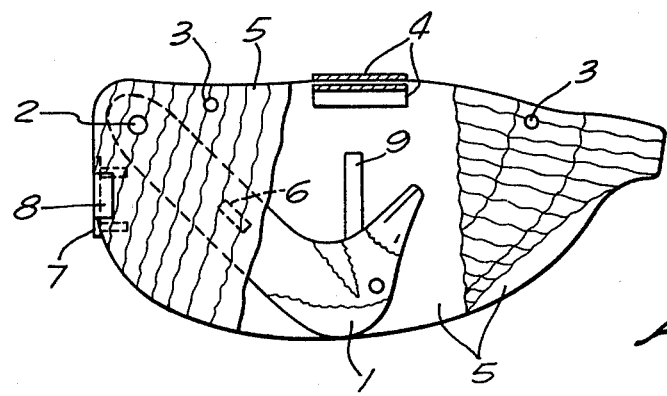
FIG. 7 is a side elevational view with a broken away portion to show the decoy in a collapsed condition for transport or storage.

The decoy is set up or put into operation by first adjusting the mounting device for current wind conditions and then spreading the body forming side members 5 apart and positioning the head and neck forming members 1 in a perpendicular position relative to the back of the decoy. The side members 5 are then placed over the mounting device, FIG. 3, so the press-to-lock nylon or polyester strips 17 match similar strips 9 fastened to the sides of the decoy. A slight pressure locks the sides 5 of the decoy to the mounting device. A quick release spread fastener 18, FIG. 6, is inserted through grommeted apertures 3 to fasten the upper back portion together. Thus viewed from the top or an overhead position, the decoy presents a full bodied effect.

The flap 7, which is fastened to one side of the decoy by a hinge 8, is then positioned in the frontal position of the decoy and secured in place by pressing the press-to-lock nylon or polyester strips 16 against similar strips 15 which are securely glued to the sides 5 of the decoy. The flap 7 fills in the gap caused by spreading the sides apart and gives the decoy a more natural frontal appearance. The head and neck forming members 1 of each side are held together in surface engagement by strips of press-to-lock nylon or polyester adhesive material 6 glued or fastened to the neck. The metal stake 14 is inserted into the ground and the decoy is operational.

Geese are especially prone to decoy in or be attracted to their own specie and depending upon circumstances the user may want to change species. To change the decoy to another specie, the user moves the head and neck forming members from a vertical to a horizontal position and separates them. The fasteners 18 or other quick release fasteners, which may be used, are removed from the grommeted apertures 3 and a slight pull at the juncture of the flap 7 and side 5 releases the flap. The user then grasps one side 5 near the mounting device and applies a slight upward pull to release the side from the mounting device. The released side along with the head and neck member attached thereto is folded over the opposite side. A slight pull releases the opposite side from the mounting device. The surfaces of the main body forming sides plus head and neck portions, which were initially on the inside and not visible, are now exposed and have the coloration simulating a different species of goose or duck. This novel feature of the invention has considerable merit for the user. The decoy is then placed on the mounting device and set up for use as previously described.

Thus, it will be apparent that I have provided a decoy constructed in a unique manner which allows the user to readily convert the decoy from one specie to another with a minimum of effort or skill required. The utility of the decoy is thus doubled over the commonly used collapsible decoys and results in a lesser number of decoys for the user to transport or carry. In addition, the decoy would be relatively inexpensive to manufacture as the material usage would be cut approximately in half when compared to manufacturing or fabricating a single specie collapsible decoy of a general similarity.

While I have described the preferred embodiment of my invention, it will of course be understood that various changes may be made in the details, form, proportions and arrangements of the various parts without departing from the scope of the invention.

I claim:

1. A foldable decoy comprising:
   two body forming opposable side members formed of a flexible flat material;
   hinge means interconnecting the top edges of the side members permitting the side members to be hinged into angular relation with their bottom edges laterally spaced apart;
   head and neck forming members respectively pivotally swingably attached at their inner ends to the body forming side members;
   means for releasably interconnecting the neck and head forming members together; and
   supporting means positionable between the angularly disposed side members and being releasably connectable with inner surfaces of the angularly disposed side members, and including a ground penetrating stake.

2. A decoy according to claim 1, in which :
   said body forming side members and connected neck and head forming members are hingedly swingable from one angularly disposed interconnected position to a reversed angularly disposed interconnected position to selectively display decoy fowls of different species.

3. A decoy according to claim 1, in which :
   the means for releasably interconnecting the neck and head forming members includes surface mounted pressure engageable strip members.

4. A decoy according to claim 1, in which:
   the supporting means comprises a generally triangular shaped spreader panel having an axial passage mounting the stake therein for relative rotational movements in response to ambient wind currents; and
   opposed edges of said spreader and the associated side members are releasably interconnected by surface mounted pressure engageable strip members.

5. A decoy according to claim 4, in which:
braking means are adjustable for controlling the relative rotational movements between said panel and said stake.

6. A decoy according to claim 4, in which:
said panel is supported on an underlying abutment flange on said stake;
the upper end of the stake is formed to threadedly receive a wing-nut; and
a washer is interposed between the wing-nut and said panel, whereby adjustment of the wing-nut provides a controlled frictional braking effect on the relative rotational movements between said stake and said panel.

* * * * *